US012651334B2

(12) United States Patent
Woodard et al.

(10) Patent No.: US 12,651,334 B2
(45) Date of Patent: Jun. 9, 2026

(54) CAROTID PLAQUE SEGMENTATION USING TRAINED NEURAL NETWORK

(71) Applicant: Washington University, St. Louis, MO (US)

(72) Inventors: Pamela Woodard, St. Louis, MO (US); Ran Li, St. Louis, MO (US); Abhinav Kumar Jha, St. Louis, MO (US); Jie Zheng, St. Louis, MO (US)

(73) Assignee: Washington University, St. Louis, MO (US)

( * ) Notice: Subject to any disclaimer, the term of this patent is extended or adjusted under 35 U.S.C. 154(b) by 345 days.

(21) Appl. No.: 18/236,034

(22) Filed: Aug. 21, 2023

(65) Prior Publication Data

US 2024/0062366 A1     Feb. 22, 2024

Related U.S. Application Data

(60) Provisional application No. 63/399,325, filed on Aug. 19, 2022.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/20084* (2013.01)

(58) Field of Classification Search
CPC ........... G06T 2207/20084; G06T 2207/20081; G06V 10/82; G06V 2201/03
See application file for complete search history.

(56) References Cited

U.S. PATENT DOCUMENTS

| | | | | |
|---|---|---|---|---|
| 1,076,237 A | * | 10/1913 | Sartori | A47G 1/16 |
| | | | | 40/790 |
| 9,235,887 B2 | * | 1/2016 | Buckler | G06T 7/143 |
| 10,762,637 B2 | * | 9/2020 | Gulsun | G06N 3/04 |
| 2005/0043614 A1 | * | 2/2005 | Huizenga | A61B 5/02007 |
| | | | | 600/427 |

(Continued)

FOREIGN PATENT DOCUMENTS

| | | | | |
|---|---|---|---|---|
| CN | 111667478 A | | 9/2020 | |
| CN | 116862823 A | * | 10/2023 | G06T 7/0012 |

(Continued)

OTHER PUBLICATIONS

Van 't Klooster R, Patterson AJ, Young VE, Gillard JH, Reiber JH, van der Geest RJ. An objective method to optimize the MR sequence set for plaque classification in carotid vessel wall images using automated image segmentation. PLoS One. Oct. 23, 2013; (Year: 2013).*

(Continued)

*Primary Examiner* — Gandhi Thirugnanam
(74) *Attorney, Agent, or Firm* — Polsinelli PC

(57) ABSTRACT

A method of processing image data includes receiving at least one image of a patient; providing the at least one image of the patient to a multi-stage trained model for segmenting the at least one image; and processing the at least one image based on the multi-stage trained model to segment the image into a plurality of segmented images that are separated based on plaque components.

10 Claims, 8 Drawing Sheets
(4 of 8 Drawing Sheet(s) Filed in Color)

(56) References Cited

U.S. PATENT DOCUMENTS

| | | | | |
|---|---|---|---|---|
| 2015/0016702 | A1 * | 1/2015 | Huizenga | A61B 6/00 |
| | | | | 382/131 |
| 2021/0125337 | A1 * | 4/2021 | Wilson | G06N 3/08 |
| 2022/0392616 | A1 * | 12/2022 | Ghose | G06V 10/774 |
| 2024/0062366 | A1 * | 2/2024 | Woodard | G06T 7/0012 |
| 2024/0065667 | A1 * | 2/2024 | Jatautas | A61B 8/0858 |

FOREIGN PATENT DOCUMENTS

| | | | | |
|---|---|---|---|---|
| CN | 117115187 A | * | 11/2023 | G06T 7/11 |
| WO | 2020019757 A1 | | 1/2020 | |

OTHER PUBLICATIONS

Fei Liu, Dongxiang Xu, Marina S. Ferguson, Baocheng Chu, Tobias Saam, Norihide Takaya, Thomas S. Hatsukami, Chun Yuan, William S. Kerwin, Automated in vivo segmentation of carotid plaque MRI with Morphology-Enhanced probability maps, Magnetic resonance in Medicine, vol. 55, Issue3 (Year: 2006).*

Li R, Zheng J, Zayed MA, Saffitz JE, Woodard PK, Jha AK. Carotid atherosclerotic plaque segmentation in multi-weighted MRI using a two-stage neural network: advantages of training with high-resolution imaging and histology. Front Cardiovasc Med. May 24, 2023; (Year: 2023).*

Hofman JM, Branderhorst WJ, ten Eikelder HM, Cappendijk VC, Heeneman S, Kooi ME, Hilbers PA, ter Haar Romeny BM. Quantification of atherosclerotic plaque components using in vivo MRI and supervised classifiers. Magn Reson Med. Apr. 2006;55(4):790-9. (Year: 2006).*

Y. Dong, Y. Pan, X. Zhao, R. Li, C. Yuan and W. Xu, "Identifying Carotid Plaque Composition in MRI with Convolutional Neural Networks," 2017 IEEE International Conference on Smart Computing (SmartComp), Hong Kong, China, 2017, pp. 1-8, (Year: 2017).*

* cited by examiner

T1

Manual
Annotations

The proposed
method

CAROTID PLAQUE SEGMENTATION USING TRAINED NEURAL NETWORK

CROSS-REFERENCE TO RELATED APPLICATIONS

This application claims priority from U.S. Provisional Application Ser. No. 63/399,325 filed on Aug. 19, 2022, which is incorporated herein by reference in its entirety.

STATEMENT REGARDING FEDERALLY SPONSORED RESEARCH OR DEVELOPMENT

This invention was made with government support under HL132600, HL150891, EB031051, and EB028287 awarded by the National Institutes of Health. The government has certain rights in the invention.

FIELD

In some examples, systems and techniques are described for carotid plaque segmentation using trained neural networks.

SUMMARY

Disclosed are systems, apparatuses, methods, and computer-readable media for processing segmented carotid plaque components. According to at least one example, a method is provided for processing segmented carotid plaque components. The method includes: receiving at least one image of a patient; segmenting a first image of the at least one image using a multi-stage trained model; and processing the first image with additional images of the at least one image based on the multi-stage trained model to segment the at least one image into a plurality of segmented images that are separated based on plaque components.

In another example, an apparatus for processing segmented carotid plaque components is provided that includes at least one memory and at least one processor coupled to the at least one memory. The at least one processor is configured to receive at least one image of a patient; segment a first image of the at least one image using a multi-stage trained model; and process the first image with additional images of the at least one image based on the multi-stage trained model to segment the at least one image into a plurality of segmented images that are separated based on plaque components.

In another example, a non-transitory computer-readable medium is provided that has stored thereon instructions that, when executed by one or more processors, cause the one or more processors to: receive at least one image of a patient; segment a first image of the at least one image using a multi-stage trained model; and process the first image with additional images of the at least one image based on the multi-stage trained model to segment the at least one image into a plurality of segmented images that are separated based on plaque components.

In another example, an apparatus for processing segmenting carotid plaque components is provided. The apparatus includes: means for receiving at least one image of a patient; means for segmenting a first image of the at least one image using a multi-stage trained model; and means for processing the first image with additional images of the at least one image based on the multi-stage trained model to segment the at least one image into a plurality of segmented images that are separated based on plaque components.

In some aspects, one or more of the methods, apparatuses, and computer-readable medium described above further include: generating identification information of a tissue region.

In some aspects, the identification information of the tissue region includes a mask that identifies a lumen and an outer artery wall of carotid plaque tissue.

In some aspects, a first-stage model of the multi-stage model includes a model trained by a convolutional neural network (CNN).

In some aspects, one or more of the methods, apparatuses, and computer-readable medium described above further include: combining the mask with the at least one image into a combined image; providing the combined image to a second stage of the multi-stage trained model; mapping each pixel in the combined image into a type of plaque component; and outputting a plurality of images corresponding to the type of plaque component.

In some aspects, one or more of the methods, apparatuses, and computer-readable medium described above further include: for each pixel, determining a probability that the pixel corresponds to each type of plaque component.

In some aspects, the type of plaque component is selected from at least one of a lipid rich necrotic core (LRNC) with hemorrhage, calcification, and fibrous tissue.

In some aspects, the second stage of the multi-stage trained model is a BNN.

In some aspects, a method for processing an image of a patient. The method may include receiving at least one image of a patient; providing the image of the patient to a trained model for segmenting the image; and processing the image based on a multi-stage trained model to segment the image into a plurality of segmented images that are separated based on plaque components.

In some aspects, processing the image based on the multi-stage trained model may include generating identification information of a tissue region of the patient from the at least one image in a first stage.

In an aspect, the identification information of the tissue region may include a mask that identifies a lumen and outer artery wall of a carotid plaque tissue. In an aspect, the first-stage model may be a CNN. In an aspect, the first stage may generate the mask that identifies the lumen and outer artery wall of the carotid plaque tissue.

In some aspects, processing the image based on the multi-stage trained model includes: combining the mask with the at least one image into a combined image; providing the combined image to a second stage of the multi-stage trained model; mapping each pixel in the combined image into a type of plaque component; and outputting a plurality of images corresponding to the type of plaque component. In an aspect, mapping each pixel includes for each pixel, determining a probability that the pixel corresponds to each type of plaque component.

In some aspects, the types of plaque components include lipid rich necrotic core (LRNC) with hemorrhage, calcification, and fibrous tissue. In an aspect, the second stage of the multi-stage trained model is a BNN.

In an aspect, a high-resolution image data set informs the training of a segmentation and classification network to improve segmentation of the multi-stage trained model and classification capabilities multi-stage trained model to be above a training data set of the same resolution as a test imaging data set.

Further disclosed herein is a non-transitory computer readable medium storing instructions thereon that when executed by at least one processor, causes the at least one processor to perform operations for processing at least one image. In an aspect the operations may include receiving at least one image of a patient; providing the image of the patient to a trained model for segmenting the image; and processing the image based on a multi-stage trained model to segment the image into a plurality of segmented images that are separated based on plaque components.

In an aspect, the operations may further include generating identification information of a tissue region of the patient from the at least one image in a first stage. In some aspects, the identification information of the tissue region comprises a mask that identifies a lumen and outer artery wall of a carotid plaque tissue. In an aspect, the first-stage model is a CNN. In an aspect, the first stage may generate the mask that identifies the lumen and outer artery wall of the carotid plaque tissue.

In some aspects, processing the image based on the multi-stage trained model may include combining the mask with the at least one image into a combined image; providing the combined image to a second stage of the multi-stage trained model; mapping each pixel in the combined image into a type of plaque component; and outputting a plurality of images corresponding to the type of plaque component. In some aspects, the mapping of each pixel in the combined image may include for each pixel, determining a probability that the pixel corresponds to each type of plaque component.

In an aspect, the types of plaque components may be selected from the group consisting of lipid rich necrotic core (LRNC) with hemorrhage, calcification, and fibrous tissue. In an aspect, the second stage of the multi-stage trained model is a BNN. In an aspect, a high-resolution image data set may inform the training of a segmentation and classification network to improve segmentation of the multi-stage trained model and classification capabilities of the multi-stage trained model to be above a training data set of the same resolution as a test imaging data set.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The patent or patent application file contains at least one drawing in color. Copies of this patent or patent application publication with color drawing(s) will be provided by the Office upon request and payment of the necessary fee.

DETAILED DESCRIPTION

Figure 1:
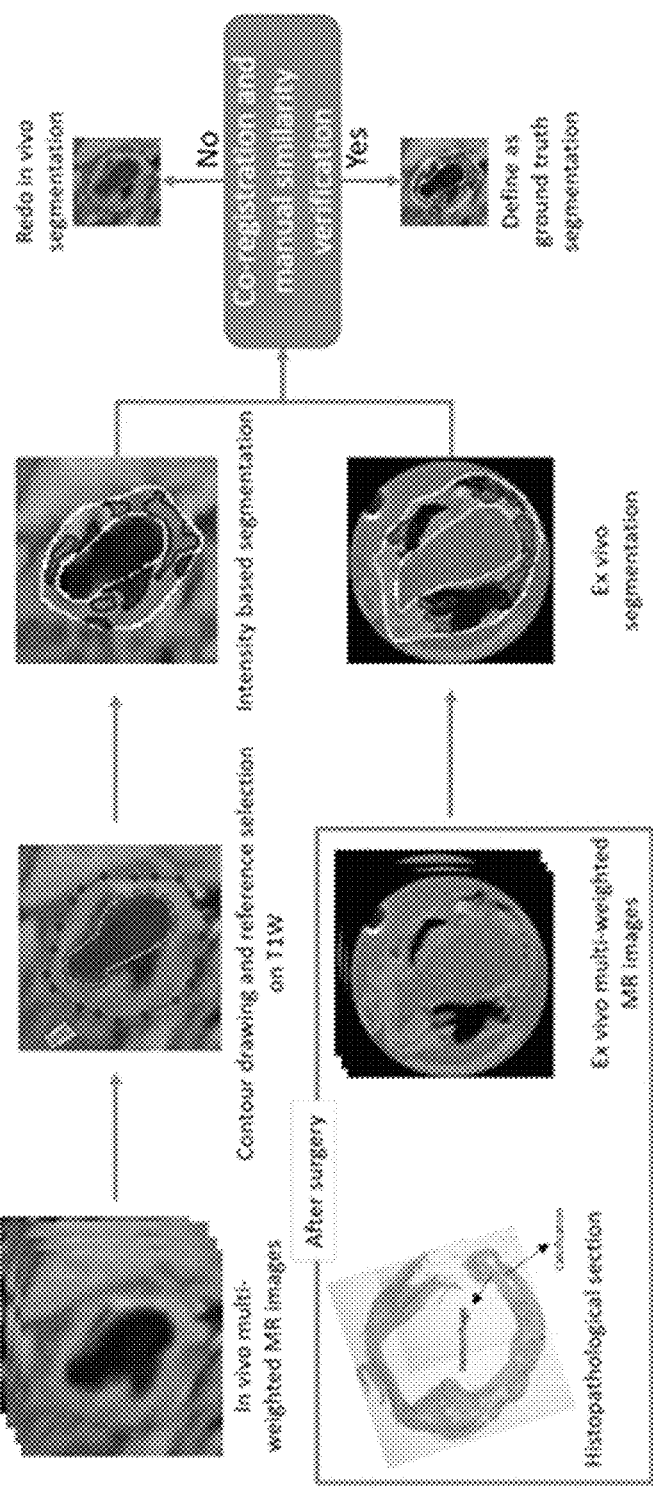
FIG. 1 illustrates the segmentation procedure used to generate ground truth.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The ensuing description provides example aspects only and is not intended to limit the scope, applicability, or configuration of the disclosure. Rather, the ensuing description of the exemplary aspects will provide those skilled in the art with an enabling description for implementing an aspect of the disclosure. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As used herein, "about" refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result.

Atherosclerosis is the most common cause of death in the United States and throughout the world and identification of atherosclerotic plaque composition including high risk features such as lipid rich necrotic core (LRNC) with hemorrhage has the potential to allow for event risk assessment and may allow better selection of patients for intervention. In some aspects, high-resolution multi-weighted magnetic resonance imaging (MRI) has emerged as an effective tool for the visualization and characterization of atherosclerotic plaque composition. The signal characteristics of major plaque components across MR sequences of various (e.g., T1, T2, proton density) weighting have been well established with respect to histology, and five different atherosclerotic plaque components, identified in Table 2 below, have been identified based on signal intensities of multi-weighted MR images.

Manual segmentation of these plaque components is time-consuming, expensive, and requires the availability of experienced personnel. To address these issues, several automated segmentation algorithms based on multi-weighted MR images have been developed. Supervised segmentation methods may use a data subset as a training set on which segmentation is performed manually. While some supervised segmentation methods perform voxel-wise segmentation using image properties such as the absolute value of intensities, intensity gradients, and wall distances, most supervised segmentation methods are highly dependent on manually provided reference values. These values are error-prone due to inter and intra-reader variability and training set image quality which, because of its in vivo acquisition, is often limited by modest resolution, blur, distortion, and noise.

Disclosed are automated methods to reliably segment atherosclerotic plaque components and optimized data sets for network training that reduce inter and intra-reader variability and minimize issues with training set image quality. In some aspects, a two-stage neural-network-based method for vessel wall and plaque component segmentation is disclosed that uses high-resolution ex vivo MR images and histopathology acquired post-surgery in the same set of patients to refine manually-defined in vivo MR image training sets. The neural network includes a convolutional neural network (CNN) for inner and outer vessel wall segmentation and a Bayesian deep neural network (BNN) for the input of aggregated multi-weighted MR image data. In some aspects, BNN achieves pixel-level segmentation of plaque components and quantifies segmentation, as yielded by both an epistemic and an aleatoric uncertainty map.

In some aspects, the method may include collecting data to train the neural network. The collected data may be training data including ex vivo and in vivo MR images taken pre and post-surgery. In other examples, other imaging methods and techniques known in the art may be used to acquire data. In some examples, the data collected to train the neural network (e.g., training data) may be high-resolution images.

Data samples may be provided by scanning patents in vivo on an MR scanner. In some examples, the MR scanner may use bilateral dedicated 4-element carotid surface coils. In an example, the data samples may be taken within one week to about two weeks, two weeks to about three weeks, or three weeks to about four weeks prior to surgery. Multi-weighted MR images which provide a contrast composition that correlates with plaque tissue type to include LRNC with hemorrhage may be obtained. MR sequences may include spin-lattice relaxation time (T1-weighted) ("T1 W"), spin-spin transverse relaxation (T2-weighted)("T2 W"), proton-density weighted ("PDW"), and/or time of flight ("TOF"). In some examples, within about 30 minutes to about 1 hour, about 1 hour to about 2 hours, about 2 hours to about 3 hours, or about 3 hours to about 4 hours after surgery, the dissected carotid plaque tissue may be placed in Phosphate Buffered Saline (PBS) solution or other solutions known in the art. The dissected carotid may then be scanned ex vivo on an MR scanner. In some examples, ex vivo and in vivo scanning may use the same MR protocol. In other examples, the ex vivo scanning may be conducted using a similar but higher resolution multi-weighted MR protocol than used for in vivo imaging. A 1 mm to 5 mm, 5 mm to 10 mm, 1 cm to 5 cm, or 5 cm to 10 cm diameter volume coil may be used as a transmitter and receiver. In some examples a 3.5 cm diameter volume coil may be used as a transmitter and receiver. After the ex vivo MRI examination, the tissue may be fixed and stained with hematoxylin and eosin (H&E) and Masson's trichrome stain. In other examples, other fixing and staining materials known in the art may be used. The tissue samples may be cut every 1 mm, in an orientation to approximate the orientation of the MRI slices. In other examples, the tissue samples may be cut in different sizes, such as about every 1 mm to about every 5 mm, about every 5 mm to about every 10 mm, or larger. The whole dataset may include a total of about 10 to about 20, about 20 to about 30, about 30 to about 40, about 40 to about 50, about 50 to about 60, about 60 to about 70, about 70 to about 80, about 80 to about 90, about 90 to about 100, or more sets of in vivo MR images, ex vivo MR images, and corresponding pathological sections. In some aspects, the ex vivo and pathological sections may be used to establish the ground truth.

It will be appreciated that other training data collections may be conducted using known methods in the art. The above examples for training data are not meant to be limitations, but rather are examples for how data may be collected. Other methods for collecting training data may be conducted without departing from the scope of the present disclosure.

In some aspects, an external dataset may be obtained to evaluate model performance by scanning patients on an MRI system to obtain in vivo multi-contrast MR images. A pair of 4-element surface carotid coils may placed around the neck of each patient for signal reception. In other examples, other types of surface carotid coils may be used. All images may be co-registered based on the distance to the bifurcation. Supervised selection of in vivo MR slices with distinguishable carotid anatomy may be selected for the evaluation dataset.

The acquired images may be corrected for signal intensity artifacts and images from different MR sequences may be co-registered. Following these steps, to generate ground-truth data for training the network, three atherosclerotic plaque components, namely LRNC with older hemorrhage, calcification, and fibrous tissue may be segmented. A single supervisor (e.g., a trained MRI reader) may be employed to generate ground truth to improve the consistency of results. In other examples, two, three, four, five, six, seven, eight, nine, ten or more supervisors (e.g., trained MRI readers) may be employed to generate ground truth. Intensity-based criteria may be used for tissue classification to perform preliminary segmentation of these plaque components.

The preliminary segmentation may then be manually validated with the assistance of ex vivo images and histopathology to establish the ground truth. First, the lumen and outer boundary of the vessel wall may be manually identified. To minimize the impact of noise and improve the consistency of manual segmentation, the adjacent sterno-cleidomastoid muscle may be used as a reference to quantitatively define the threshold and signal intensity criterion. The mean and standard deviation of the reference muscle region may be denoted by $\mu RM$ and $\sigma RM$, respectively. Also, the intensity values for classifying the pixel values as hyperintense, isointense, and hypointense may be denoted by IHyper, IIso, and IHypo. These intensity ranges are defined as:

$$\mu_{RM}+1.5\sigma_{RM} \leq I_{Hyper} < 255 \qquad (1)$$

$$\mu_{RM}-1.5\sigma_{RM} \leq I_{Iso} < \mu_{RM}+1.5\sigma_{RM} \qquad (2)$$

$$0 < I_{Hypo} \leq \mu_{RM}-1.5\sigma_{RM} \qquad (3)$$

FIG. 1 illustrates the segmentation procedure used to generate ground truth. The ex vivo images may be obtained with an imaging protocol similar to that used for in vivo imaging, except with higher spatial resolution (ex vivo: 0.098×0.098×1 mm$^3$ vs in vivo: 0.46×0.46×3 mm$^3$). In other examples, other spatial resolutions may be used. In some cases, histopathology may be used to define the ground truth. However, stained plaque tissue may shrink, and the thickness of stained tissue may be only about 5 μm. Histopathology may be difficult to match to in vivo MR data which has a thickness of about 3 mm and, in comparison, relatively low resolution (0.46×0.46 mm$^2$). In this case, ex vivo MR data, has a thickness of about 1 mm and much higher spatial resolution (0.098×0.098 mm$^2$), with an image orientation similar to the histopathologic stained specimens. In other examples, ex vivo MR data may have different thicknesses and resolutions known in the art. Therefore, the segmented ex vivo images may be compared to the histopathology for easy and unambiguous validation of the generated ground truth. The role of histopathology, in this case, is to validate the segmented plaque components on the ex vivo MR images in terms of tissue type and location. The same intensity-based criteria may be used on the in vivo MR images to segment the ex vivo image. The second row of FIG. 1 shows the histopathological sections with the segmentation of their corresponding ex vivo MR images. To validate the in vivo segmentation, the single supervisor or multiple supervisors may ensure locations, sizes, and shapes of plaque components in segmented in vivo images are as close as possible to the segmented ex vivo images. If the in vivo segmentation has an apparent difference from ex vivo segmentation and pathological sections, the reference muscle may be reselected until the difference is eliminated. All ground-truth generating steps may be performed using a custom-designed tool.

After preprocessing, segmenting, and manually validating ground truth, a dataset of 2D slices may be obtained and a subset of that dataset may be augmented using flipping and rotation to yield the training set. Once trained, the training method may be tested against slices from a control group of patients, where again, the ground truth may be defined with the assistance of ex vivo MR imaging data and histopathology. Further, as mentioned above, the training method may also be tested with an external test dataset of MR slices obtained from an MR scanner. Ground truth segmentation of these images may be obtained using manual annotation performed by an experienced observer, or observers, with the same custom-designed tool as described above. It will be appreciated that the above method of obtaining training data, evaluating data, and generating ground truth is an example of one method. In other examples, other methods for collecting training data, evaluating data, and generating ground truth may be used.

The disclosed method may comprise two networks, namely a CNN followed by a BNN, referred to as Stage I and Stage II, respectively. In other examples, more than two networks may be used. T1 W images may be put into the CNN algorithm which segments the contours of the lumen and outer artery wall. Because the training-data size may be limited and randomness may be present in the selection of reference muscle tissue during the generation of ground truth, these factors may cause uncertainty in the segmented output. To quantify this uncertainty, a Bayesian estimation may be introduced into the second part of a neural network. More specifically, the output of the CNN may be grouped with the 4-channel aggregated MR images and input to the BNN, which then may provide both segmentation of plaque components and quantification of the uncertainty of the segmentation.

The CNN and the BNN may have a similar network architecture, comprised of an encoder and a decoder connected with skip connections. The encoder may be composed of 5 convolutional blocks each with 64, 128, 256, 512, and 1024 output channels. In other examples, more than 5 convolutional blocks may be used and different output channels or combinations of output channels may be used. The first encoder block may comprise two 3×3 convolutional layers with 1×1 striding. The other blocks may use two 3×3 convolutional layers with 2×2 and 1×1 striding respectively, each of them followed by batch normalization and leaky ReLUs. The stride 2 convolutional layers may replace the pooling layer used in standard U-Net models. The advantage of the stride 2 convolution layer is that it can learn certain properties that might be ignored in a pooling layer where parameters are fixed during the whole training process. The decoder consisted of 4 deconvolutional blocks with 512, 256, 128, and 64 output channels. In other examples, more than 4 deconvolutional blocks may be used and different output channels or combinations of output channels may be used. These blocks may be modified to use 2×2 striding transposed convolution followed by a convolutional layer. A concatenation layer to concatenate the up-sample outputs of the last convolutional layers of the four deconvolutional blocks followed the last deconvolutional block of CNN in Stage I. A final 1×1 convolutional layer may be used at the end to implement a weighted summation regarding the parameters of different filters in the former convolutional layer. To enable an epistemic uncertainty estimation, the normal convolutional layer may be replaced with a flip-out convolutional layer in each convolutional block of the BNN in Stage II.

Figure 2:
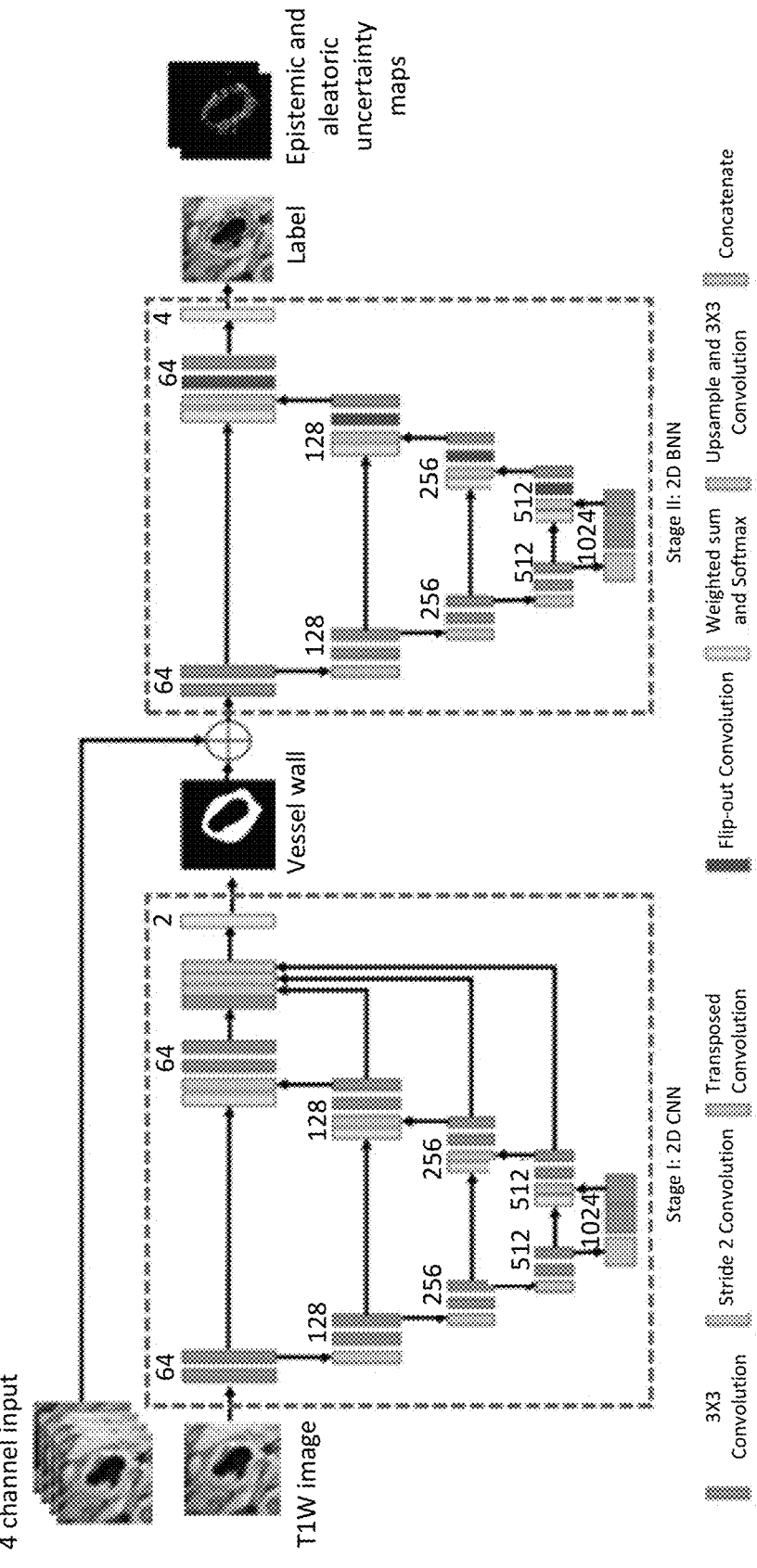
FIG. 2 illustrates details of a network architecture in one example.
Figure 3:
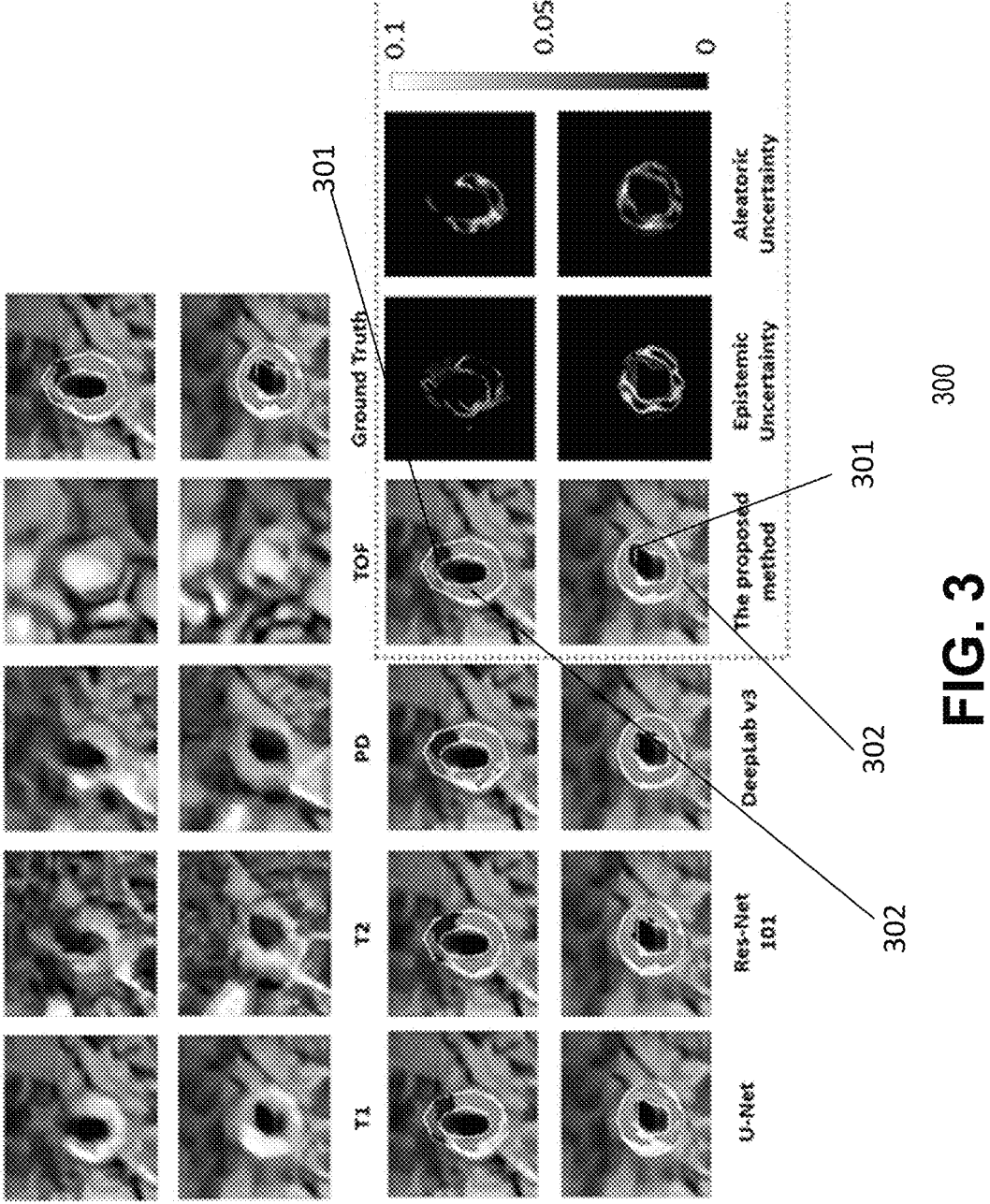
FIG. 3 illustrates two representative results of plaque segmentation.
Figure 4:
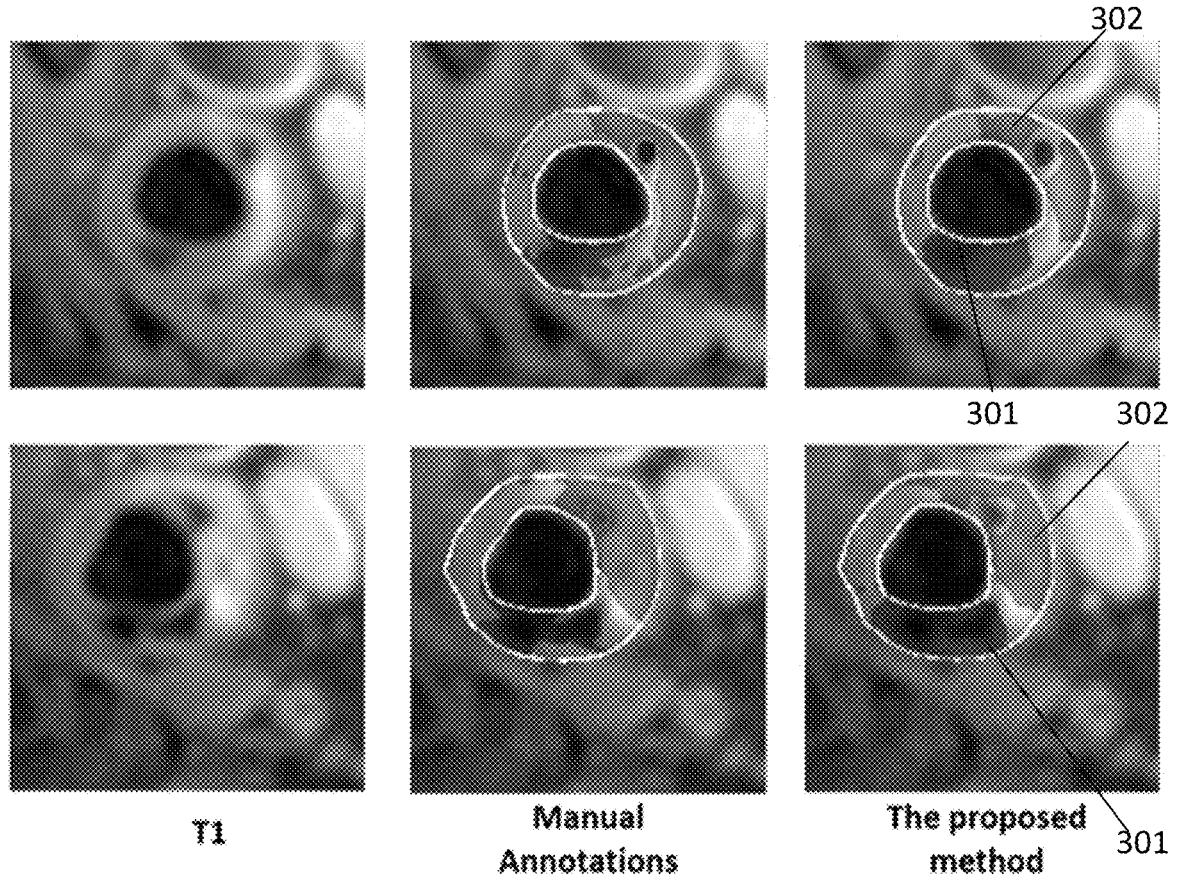
FIG. 4 illustrates two representative results of plaque segmentation and external validation of the proposed method in one example.

The contours of the vessel wall may be delineated on T1 W images only, so only T1 W images are fed into the CNN in Stage I. The output of the CNN may be a mask that identifies a lumen and an outer artery wall of carotid plaque tissue. The output of the first CNN and the 4-channel images comprising each of the four different weighted MR images in each channel may be concatenated as the input of the second BNN structure. The output of Stage II comprises a probabilistic map of the four components and the uncertainty map. The details of network architecture, as well as the input and output, are provided in FIG. 2. FIGS. 3-4 illustrate the output of Stage II.

The CNN and BNN may be trained separately. The CNN may be trained with T1 W images only, and the network hyperparameters may be optimized on the training set via five-fold cross-validation. Subsequently, the BNN may be trained with the same training set but comprised of all multi-weighted MR images and vessel wall masks. The hyperparameter combination of BNN may be optimized with the same method as that of CNN.

The loss functions of the CNN and BNN may be a combination of cross-entropy loss, Dice loss, and K-L divergence loss, denoted by $Loss_{ce}$, $Loss_{Dice}$, and $Loss_{KLD}$ respectively. These loss functions are given by:

$$Loss_{ce} = (y_{true} \log(y_{pred}) + (1 - y_{true}) \log(1 - y_{pred}), \tag{4}$$

$$Loss_{Dice} = 1 - \frac{2 \sum_{pixel} y_{true} y_{pred}}{\sum_{pixel} y_{true}^2 + \sum_{pixel} y_{pred}^2}, \tag{5}$$

-continued $$\text{Loss}_{KLD} = \sum_{pixel} y_{true} \log\left(\frac{y_{true}}{y_{pred}}\right). \tag{6}$$

The mixed loss function of CNN, denoted by $\text{Loss}_{CNN}$, is given by:

$$\text{Loss}_{CNN} = \frac{1}{2}(\text{Loss}_{ce} + \text{Loss}_{Dice}). \tag{7}$$

The purpose of the mixed loss function of CNN is to handle the class imbalance caused by the vessel wall, which often occupies a considerably smaller volume relative to the background.

The mixed loss function of BNN, denoted by $\text{Loss}_{BNN}$, is given by:

$$\text{Loss}_{BNN} = \frac{1}{2}(\text{Loss}_{ce} + \text{Loss}_{KLD}). \tag{8}$$

The $\text{Loss}_{KLD}$ is added to the $\text{Loss}_{BNN}$ for the posterior distribution approximation of the BNN. With these computational resources, it may take less than 4 seconds to segment a patient image.

As the parameters of the BNN are a set of posterior distributions learned on the training dataset, an ensemble estimator with multiple predictors may be applied to the output of Stage II. The final segmentation of plaque components may be generated by assigning each pixel to the tissue categories with the highest probability. To clearly display the segmentation of carotid plaque, all final predictions of tissues may be overlaid on T1-weighted images. The disclosed method yields two types of uncertainty, namely aleatoric and epistemic uncertainty. The uncertainty may be quantified on a 14-slice test data. In other examples, the uncertainty may be quantified on other an N-slice test data, where N is 1 to 1000 or any number therein. The output of the proposed method may include the segmentation results of all tissue types and corresponding variance maps. First, the overall epistemic uncertainty map may be obtained by calculating the mean of variance maps of all tissue categories. This uncertainty studies the influence of limited training data and provides a measure of the confidence of the segmentation results. The overall epistemic uncertainty map of the image was given by:

$$H(Y|X) = \frac{1}{M} \sum_{m=1}^{M} \text{Var}(y_m), \tag{9}$$

where Y is the prediction corresponding to input image X, and $y_m = y^1_m, y^2_m, \ldots, y^N_m$ is the ensemble estimate of N predictors corresponding to the $m_{th}$ tissue type. Next, to obtain the aleatoric uncertainty map, a test-time data augmentation method (TTDA) may be applied. Specifically, TTDA involves creating multiple augmented copies of each image in the test set, having the model make a prediction for each, then returning an ensemble of those predictions. Similar to the epistemic uncertainty map, the overall estimation of aleatoric uncertainty of an image may be inferred by:

$$H(Y|X) = \frac{1}{M} \sum_{m=1}^{M} \text{Var}(y_m), \tag{10}$$

where $y_m = y^1_m, y^2_m, \ldots, y^K_m$ is the ensemble estimation of K-time augmentation of the test image corresponding to the $m_{th}$ tissue type. In addition to the two overall uncertainty maps, the disclosed techniques also apply a class-wise uncertainty metric called predictive class-wise variance (PCV) to measure the epistemic uncertainty corresponding to tissue types of interest, which is defined as:

$$PCV(s) = \frac{1}{s} \sum_{y \in s} \sum_{k} \text{Var}(y = k), \tag{11}$$

where s represents all pixels that are segmented as class c, y is the predictive label and $$s = \left\{ y_i \middle| \arg\max_k p(y_i = k) = c, \forall\ y_i \in y \right\}.$$

Figure 5:
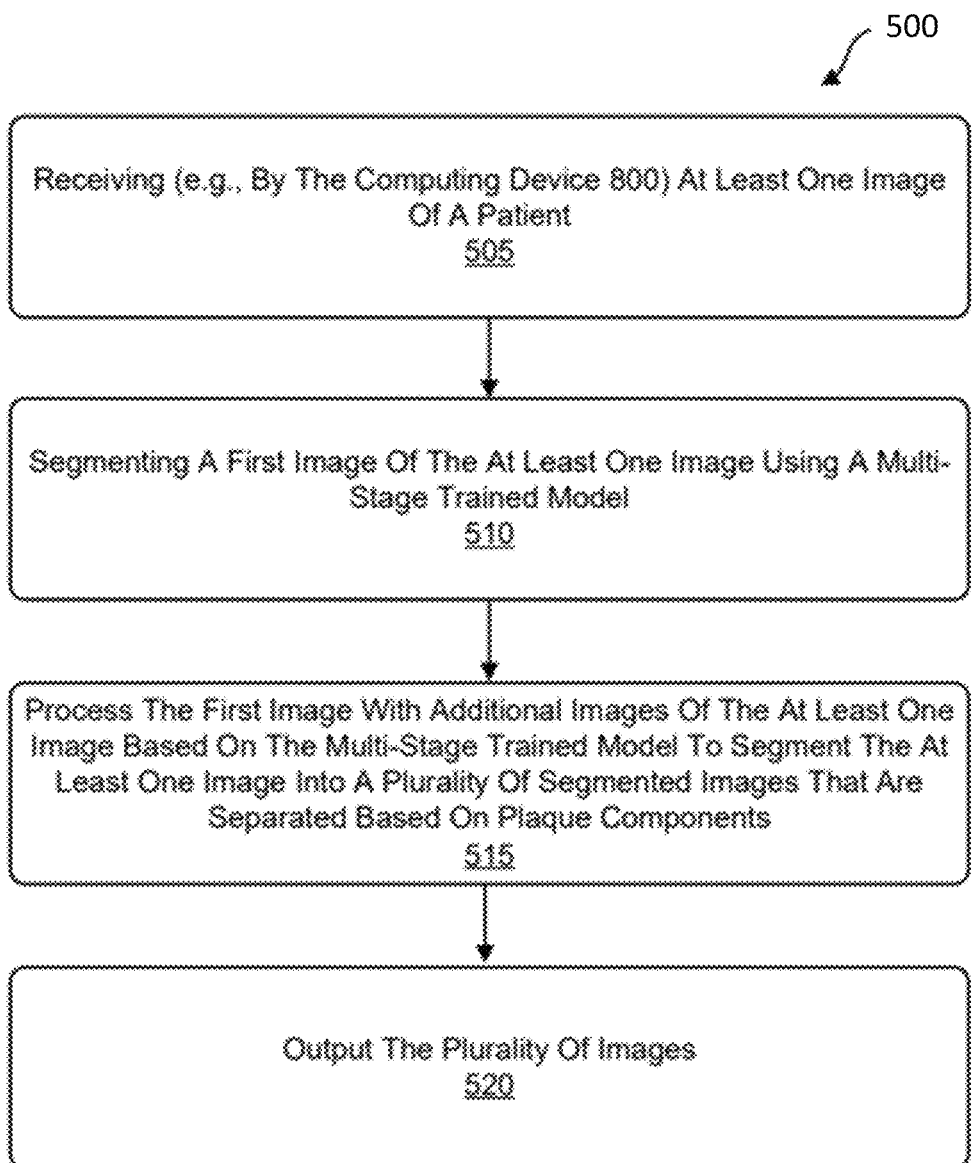
FIG. 5 is a flowchart illustrating an example of a method for carotid plaque segmentation using a trained neural network, in accordance with certain of the present disclosure.

FIG. 5 is a flowchart illustrating an example of a method 500 for carotid plaque segmentation using a trained neural network, in accordance with certain aspects of the present disclosure. The method 500 can be performed by a computing device that includes an AI model that is trained using deep learning techniques, such as a CNN. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method includes receiving (e.g., by the computing system 800) at least one image of a patient at block 505. For example, the at least one image can include a multi-channel MR image that is generated by an MRI scanner. In some examples, the image may be high-resolution. In other examples, the images may have any resolution.

According to some examples, the method includes segmenting (e.g., by the computing system 800) a first image of the at least one image using a multi-stage trained model at block 510. The segmenting of the first image may produce identification information of a tissue region, such as a mask that identifies a lumen and an outer artery wall of carotid plaque tissue. In some aspects, a first-stage model of the multi-stage model comprises a model trained by a convolutional neural network (CNN). In some aspects, the first image may be a T1 W image.

According to some examples, the method includes processing (e.g., by the computing system 800) the first image with additional images of the at least one image based on the multi-stage trained model to segment the at least one image into a plurality of segmented images that are separated based on plaque components at block 515. In one illustrative aspect, the additional images may be different MR images disclosed above. In some aspects, the additional images may be spin-spin transverse relaxation (T2-weighted)("T2 W"), proton-density weighted ("PDW"), and/or time of flight ("TOF") which may be part of the 4-channel input, and therefore may be different aspects of the first image.

Further, the processing of the first image with the additional images comprises combining the mask with the first image and the additional images into a combined image. Other aspects include generating multiple combined images.

Further, the method comprises providing the combined image to a second stage of the multi-stage trained model. In some aspects, the second stage can include mapping each pixel in the combined image (or combined images) into a type of plaque component. For example, a probability can be determined that a pixel, or other region of the combine image, corresponds to each type of plaque component. In one illustrative example, the types of plaque components comprise at least one of a lipid rich necrotic core (LRNC) with hemorrhage, calcification, and fibrous tissue. The second stage of the multi-stage trained model may be trained using a BNN and can include different probability calculators that determine the likelihood of a region corresponding to the type of plaque component.

At block 520, the method includes outputting the plurality of images. In this illustrative aspect, each image corresponds to a plaque component and provides an objective determination of the various plaque components and removes subjective variations that occur in human observations.

In some examples, the processes described herein (e.g., method 500, and/or other processes described herein) may be performed by a computing device or apparatus. In one example, the method 500 may be performed by a medical apparatus (e.g., an MRI), or can be performed by any other device that includes a computing device (computing system 800), such as a mobile device (e.g., a mobile phone), a desktop computing device, a tablet computing device, etc. In other aspects, the method 500 may be performed by a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the methods described herein, including the method 500. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, a network interface configured to communicate and/or receive the data, any combination thereof, and/or other component(s). The network interface may be configured to communicate and/or receive IP-based data or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

The method 500 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The method 500, and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
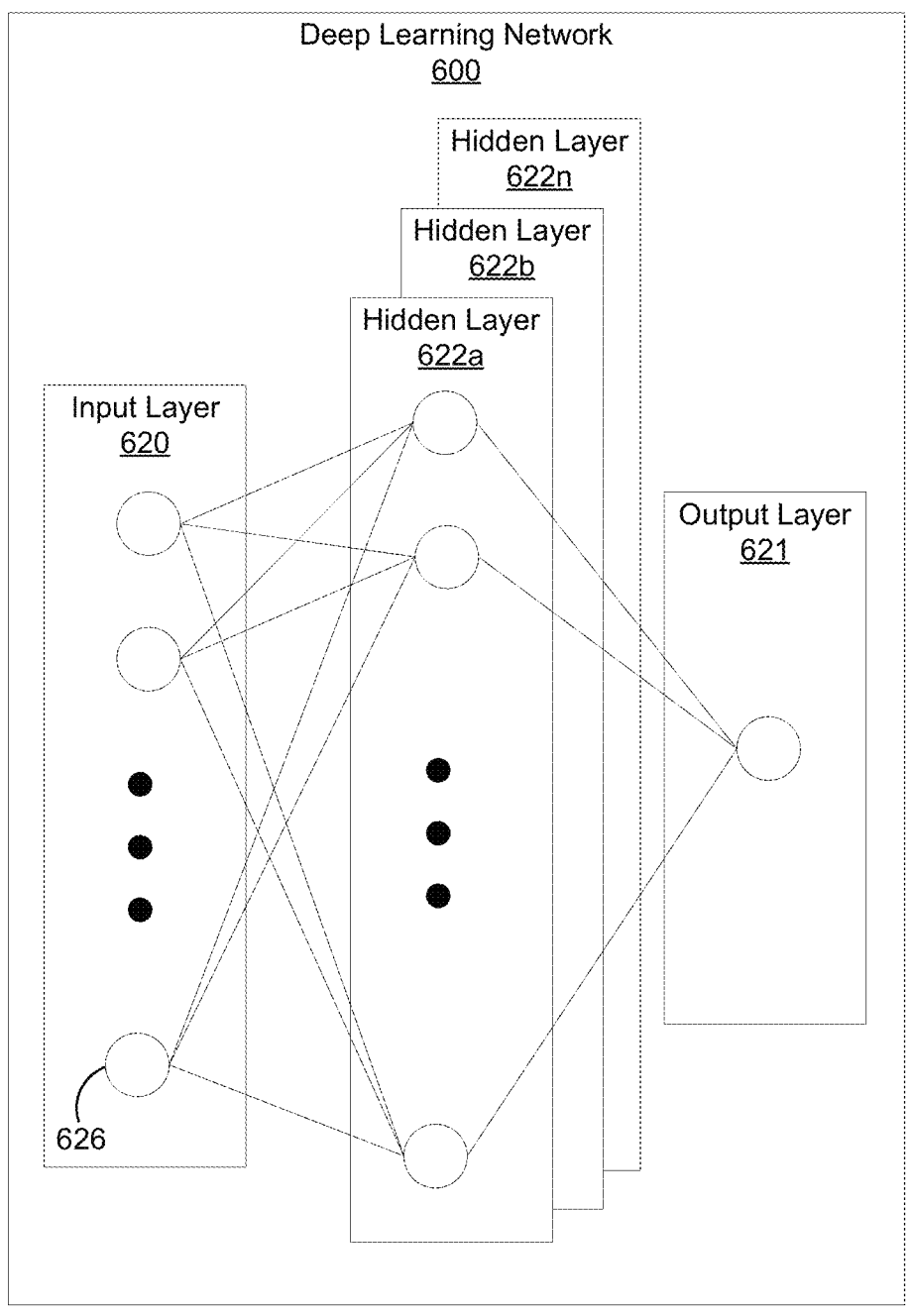
FIG. 6 illustrates an example of a deep learning neural network that can be used to implement a machine learning-based alignment prediction.

Various aspects of the present disclosure can use machine learning models or systems. FIG. 6 is an illustrative example of a deep learning neural network 600 that can be used to implement the machine learning-based alignment prediction described herein. An input layer 620 includes input data. In one illustrative example, the input layer 620 can include data representing the pixels of an input video frame. The neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622a, 622b, through 622n. In one illustrative example, the output layer 621 can provide a classification for an object in an input video frame. The classification can include a class identifying the type of activity or object (e.g., plaque components, tissue components—vessel wall and/or lumen, etc.).

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes (e.g., node 626) in the neural network 600 are shown as having multiple output lines, a node has a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621. In an example in which the neural network 600 is used to identify features and/or objects in images, the neural network 600 can be trained using training data that includes both images and labels, as described herein. For instance, training images can be input into the network, with each training frame having a label indicating the features in the images (for a feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 600 can adjust the weights of the nodes using a training process called backpropagation. As described herein, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 600 is trained well enough so that the weights of the layers are accurately tuned.

For the example of identifying features and/or objects in images, the forward pass can include passing a training image through the neural network 600. The weights are initially randomized before the neural network 600 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network

600 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE).

The loss (or error) will be high for the first training images since the actual values will be much different than the predicted output. The goal of training is to minimize the amount of loss so that the predicted output is the same as the training label. The neural network 600 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as, where w denotes a weight, $w_i$ denotes the initial weight, and n denotes a learning rate. The learning rate can be set to any suitable value, with a high learning rate including larger weight updates and a lower value indicating smaller weight updates.

The neural network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, a deep belief nets (DBNs), a Recurrent Neural Networks (RNNs), BNNs, among others.

Figure 7:
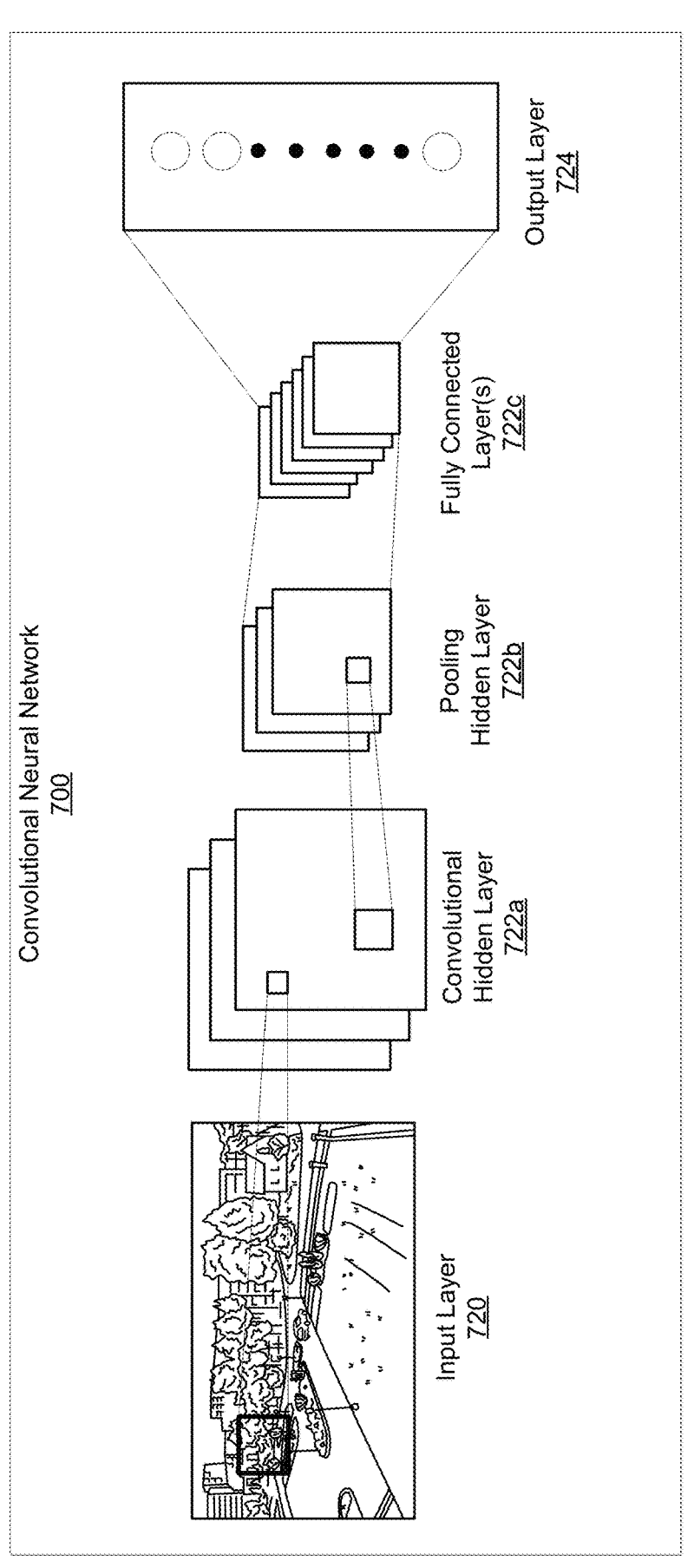
FIG. 7 illustrates an exemplary CNN.

FIG. 7 is an illustrative example of a CNN 700. The input layer 720 of the CNN 700 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 722a, an optional non-linear activation layer, a pooling hidden layer 722b, and fully connected hidden layers 722c to get an output at the output layer 724. While only one of each hidden layer is shown in FIG. 7, one of ordinary skill will appreciate that multiple convolutional hidden layers, non-linear layers, pooling hidden layers, and/or fully connected layers can be included in the CNN 700. As previously described, the output can indicate a single class of an object or can include a probability of classes that best describe the object in the image.

The first layer of the CNN 700 is the convolutional hidden layer 722a. The convolutional hidden layer 722a analyzes the image data of the input layer 720. Each node of the convolutional hidden layer 722a is connected to a region of nodes (pixels) of the input image called a receptive field. The convolutional hidden layer 722a can be considered as one or more filters (each filter corresponding to a different activation or feature map), with each convolutional iteration of a filter being a node or neuron of the convolutional hidden layer 722*a*. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 722*a*. Each connection between a node and a receptive field for that node learns a weight and, in some cases, an overall bias such that each node learns to analyze its particular local receptive field in the input image. Each node of the hidden layer 722*a* will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 722*a* is due to each node of the convolutional layer being applied to its corresponding receptive field. For example, a filter of the convolutional hidden layer 722*a* can begin in the top-left corner of the input image array and can convolve around the input image. As noted above, each convolutional iteration of the filter can be considered a node or neuron of the convolutional hidden layer 722*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is continued at a next location in the input image according to the receptive field of a next node in the convolutional hidden layer 722*a*. For example, a filter can be moved by a step amount (referred to as a stride) to the next receptive field. The stride can be set to 1 or another suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 722*a*.

The mapping from the input layer to the convolutional hidden layer 722*a* is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 722*a* can include several activation maps in order to identify multiple features in an image. The example shown in FIG. 7 includes three activation maps. Using three activation maps, the convolutional hidden layer 722*a* can detect three different kinds of features, with each feature being detectable across the entire image.

In some examples, a non-linear hidden layer can be applied after the convolutional hidden layer 722*a*. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 700 without affecting the receptive fields of the convolutional hidden layer 722*a*.

The pooling hidden layer 722*b* can be applied after the convolutional hidden layer 722*a* (and after the non-linear hidden layer when used). The pooling hidden layer 722*b* is used to simplify the information in the output from the convolutional hidden layer 722*a*. For example, the pooling hidden layer 722*b* can take each activation map output from the convolutional hidden layer 722*a* and generates a condensed activation map (or feature map) using a pooling function. Max-pooling is one example of a function performed by a pooling hidden layer. Other forms of pooling functions be used by the pooling hidden layer 722*a*, such as average pooling, L2-norm pooling, or other suitable pooling functions. A pooling function (e.g., a max-pooling filter, an L2-norm filter, or other suitable pooling filter) is applied to each activation map included in the convolutional hidden layer 722*a*. In the example shown in FIG. 7, three pooling filters are used for the three activation maps in the convolutional hidden layer 722*a*.

In some examples, max-pooling can be used by applying a max-pooling filter (e.g., having a size of 2×2) with a stride (e.g., equal to a dimension of the filter, such as a stride of 2) to an activation map output from the convolutional hidden layer 722*a*. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 722*a* having a dimension of 24×24 nodes, the output from the pooling hidden layer 722*b* will be an array of 18×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

Intuitively, the pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 700.

The final layer of connections in the network is a fully-connected layer that connects every node from the pooling hidden layer 722*b* to every one of the output nodes in the output layer 724. Using the example above, the input layer includes 28×28 nodes encoding the pixel intensities of the input image, the convolutional hidden layer 722*a* includes 3×24×24 hidden feature nodes based on application of a 5×5 local receptive field (for the filters) to three activation maps, and the pooling hidden layer 722*b* includes a layer of 3×12×12 hidden feature nodes based on application of max-pooling filter to 2×2 regions across each of the three feature maps. Extending this example, the output layer 724 can include ten output nodes. In such an example, every node of the 3×12×12 pooling hidden layer 722*b* is connected to every node of the output layer 724.

The fully connected layer 722*c* can obtain the output of the previous pooling hidden layer 722*b* (which should represent the activation maps of high-level features) and determines the features that most correlate to a particular class. For example, the fully connected layer 722*c* layer can determine the high-level features that most strongly correlate to a particular class and can include weights (nodes) for the high-level features. A product can be computed between the weights of the fully connected layer 722*c* and the pooling hidden layer 722*b* to obtain probabilities for the different classes. For example, if the CNN 700 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 724 can include an M-dimensional vector (in the prior example, M=10). M indicates the number of classes that the CNN 700 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object, an 80% probability that the image is the fourth class of object, and a 15% probability that the image is the sixth class of object. The probability for a class can be considered a confidence level that the object is part of that class.

Figure 8:
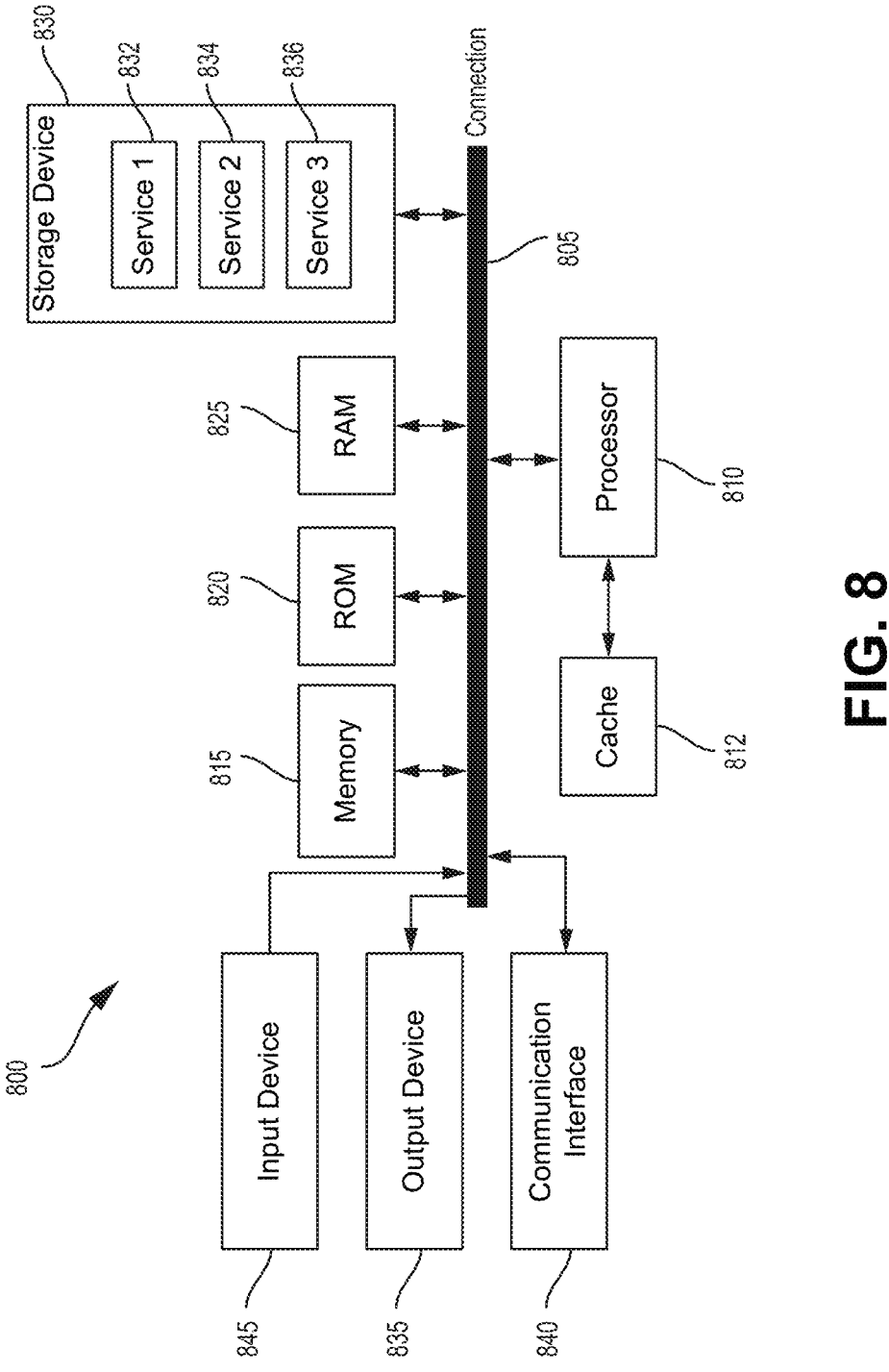
FIG. 8 is a diagram illustrating an example of a computing system.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some aspects, computing system 800 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 800 includes at least one processing unit (CPU or processor) 810 and connection 805 that couples various system components including system memory 815, such as read only memory (ROM) 820 and read only memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services

832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some aspects, a hardware service that performs a particular function can include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Examples

Data Acquisition

Data samples were provided by scanning patents in vivo on an MR scanner using bilateral dedicated 4-element carotid surface coils within one week prior to surgery. Multi-weighted MR images which provide a contrast composition that correlates with plaque tissue type to include LRNC with hemorrhage were obtained. MR sequences included spin-lattice relaxation time (T1-weighted), spin-spin transverse relaxation (T2-weighted), proton-density weighted, and time of flight (TOF). Within 2 hours of surgery, the dissected carotid plaque tissue was placed in Phosphate Buffered Saline (PBS) solution and then scanned ex vivo on an MR scanner using a similar but higher resolution multi-weighted MR protocol as used for in vivo imaging as identified below in Table 1. A 3.5-cm diameter volume coil was used as a transmitter and receiver. After the ex vivo MRI examination, the tissue was fixed and stained with hematoxylin and eosin (H&E) and Masson's trichrome stain. The tissue samples were cut every 1 mm, in an orientation to approximate the orientation of the MRI slices. The whole dataset included a total of 84 sets of in vivo MR images, ex vivo MR images, and corresponding pathological sections. In some aspects, the ex vivo and pathological sections were used to establish the ground truth.

TABLE 1

MR Imaging parameters

| | In vivo MR imaging | | | | Ex vivo MR imaging | | | |
| | T1-w | T2-w | PD-w | TOF | T1-w | T2-w | PD-w | TOF |
|---|---|---|---|---|---|---|---|---|
| TR/TE(ms/ms) | 600/5.6 | 2130/56 | 2130/5.6 | 10/2.9 | 500/10 | 2500/40 | 2500/10 | 15/4.9 |
| FOV (mm2) | 120 × 120 | 120 × 120 | 120 × 120 | 120 × 120 | 25 × 25 | 25 × 25 | 25 × 25 | 25 × 25 |
| Matrix size | 256 × 256 | 256 × 256 | 256 × 256 | 256 × 256 | 256 × 256 | 256 × 256 | 256 × 256 | 256 × 256 |
| Average number | 4 | 2 | 2 | 2 | 3 | 2 | 2 | 4 |
| Slice thickness (mm) | 3 | 3 | 3 | 3 | 1 | 1 | 1 | 1 |
| Slice number | 12 | 12 | 12 | 12 | 24 | 24 | 24 | 24 |

An external dataset was obtained to evaluate model performance by scanning patients on an MRI system to obtain in vivo multi-contrast MR images. A pair of 4-element surface carotid coils were placed around the neck of each patient for signal reception. All images were co-registered based on the distance to the bifurcation. Supervised selection of in vivo MR slices with distinguishable carotid anatomy was selected for the evaluation dataset.

Data Preprocessing and Approach to Defining Ground Truth

The acquired images were corrected for signal intensity artifacts and images from different MR sequences were co-registered. Following these steps, to generate ground-truth data for training the network, three atherosclerotic plaque components, namely LRNC with older hemorrhage, calcification, and fibrous tissue were segmented. A single supervisor (e.g., a trained MRI reader) was employed to generate ground truth to improve the consistency of results. Intensity-based criteria, identified below in Table II, was used for tissue classification to perform preliminary segmentation of these plaque components.

TABLE II

Criteria of tissue segmentation. The symbols describe the signal intensity relative to adjacent muscles. +: hyperintense, ○: isointense, -: hypointense

| | TOF | T1W | PDW | T2W |
|---|---|---|---|---|
| LRNC with Older hemorrhage | + | + | + | + |
| Fresh hemorrhage | + | + | -/○ | -/○ |

TABLE II-continued

Criteria of tissue segmentation. The symbols describe the signal intensity relative to adjacent muscles. +: hyperintense, ○: isointense, -: hypointense

| | TOF | T1W | PDW | T2W |
|---|---|---|---|---|
| No hemorrhage | ○ | ○/+ | ○/+ | -/○ |
| Calcification | - | - | - | - |
| Fibrous tissue | - | ○ | ○ | ○ |

The preliminary segmentation was then manually validated with the assistance of ex vivo images and histopathology to establish the ground truth. First, the lumen and outer boundary of the vessel wall were manually identified. To minimize the impact of noise and improve the consistency of manual segmentation, the adjacent sternocleidomastoid muscle was used as a reference to quantitatively define the threshold and signal intensity criterion. The mean and standard deviation of the reference muscle region was denoted by $\mu_{RM}$ and $\sigma_{RM}$, respectively. Also, the intensity values for classifying the pixel values as hyperintense, isointense, and hypointense were denoted by IHyper, IIso, and IHypo. For this study, these intensity ranges were defined as:

$$\mu_{RM}+1.5\sigma_{RM}{\leq}I_{Hyper}{<}255 \qquad (1)$$

$$\mu_{RM}-1.5\sigma_{RM}{\leq}I_{Iso}{<}\mu_{RM}+1.5\sigma_{RM} \qquad (2)$$

$$0{<}I_{Hypo}{\leq}\mu_{RM}-1.5\sigma_{RM} \qquad (3)$$

FIG. 1 illustrates the segmentation procedure used to generate ground truth. As shown in Table 1, the ex vivo images were obtained with an imaging protocol similar to that used for in vivo imaging, except with higher spatial resolution (ex vivo: 0.098×0.098×1 mm³ vs in vivo: 0.46× 0.46×3 mm³). In some cases, histopathology would be used to define the ground truth. However, stained plaque tissue may usually shrink and the thickness of stained tissue is only 5 μm. Histopathology may be difficult to match to in vivo MR data which has a thickness of 3 mm and, in comparison, relatively low resolution (0.46×0.46 mm²). In this case, ex vivo MR data, has a thickness of 1 mm and much higher spatial resolution (0.098×0.098 mm²), with an image orientation similar to the histopathologic stained specimens. Therefore, the segmented ex vivo images may be compared to the histopathology for easy and unambiguous validation of the generated ground truth. The role of histopathology, in this case, is to validate the segmented plaque components on the ex vivo MR images in terms of tissue type and location. The same intensity-based criteria may be used on the in vivo MR images to segment the ex vivo image. The second row of FIG. 1 shows the histopathological sections with the segmentation of their corresponding ex vivo MR images. To validate the in vivo segmentation, the single supervisor ensured locations, sizes, and shapes of plaque components in segmented in vivo images were as close as possible to the segmented ex vivo images. If the in vivo segmentation had an apparent difference from ex vivo segmentation and pathological sections, the reference muscle was reselected until the difference was eliminated. All ground-truth generating steps were performed using a custom-designed tool.

After preprocessing, segmenting, and manually validating ground truth, a dataset of 2D slices was obtained and a subset of that dataset was augmented using flipping and rotation to yield the training set. Once trained, the training method was tested against slices from a control group of patients, where again, the ground truth was defined with the assistance of ex vivo MR imaging data and histopathology. Further, as mentioned above, the training method was also tested with an external test dataset of MR slices obtained from an MR scanner. Ground truth segmentation of these images was obtained using manual annotation performed by an experienced observer with the same custom-designed tool as described above.

Proposed Segmentation Method

The proposed method consists of two networks, namely a CNN followed by a BNN, referred to as Stage I and Stage II, respectively. T1 W images are put into the CNN algorithm which segments the contours of the lumen and outer artery wall. Because the training-data size is limited and randomness may be present in the selection of reference muscle tissue during the generation of ground truth, these factors may cause uncertainty in the segmented output. To quantify this uncertainty, a Bayesian estimation is introduced into the second part of a neural network. More specifically, the output of the CNN was grouped with the 4-channel aggregated MR images and input to the BNN, which then provided both segmentation of plaque components and quantification of the uncertainty of the segmentation.

The CNN and the BNN had a similar network architecture, comprised of an encoder and a decoder connected with skip connections. The encoder was composed of 5 convolutional blocks each with 64, 128, 256, 512, and 1024 output channels. The first encoder block was comprised of two 3×3 convolutional layers with 1×1 striding. The other three blocks used two 3×3 convolutional layers with 2×2 and 1×1 striding respectively, each of them followed by batch normalization and leaky ReLUs. The stride 2 convolutional layers replaced the pooling layer used in standard U-Net models. The advantage of the stride 2 convolution layer is that it can learn certain properties that might be ignored in a pooling layer where parameters are fixed during the whole training process. The decoder consisted of 4 deconvolutional blocks with 512, 256, 128, and 64 output channels. These blocks were modified to use 2×2 striding transposed convolution followed by a convolutional layer. A concatenation layer that concatenated the up-sample outputs of the last convolutional layers of the four deconvolutional blocks followed the last deconvolutional block of CNN in Stage I. A final 1×1 convolutional layer was used at the end to implement a weighted summation regarding the parameters of different filters in the former convolutional layer. To enable an epistemic uncertainty estimation, the normal convolutional layer was replaced with a flip-out convolutional layer in each convolutional block of the BNN in Stage II.

The contours of the vessel wall were delineated on T1 W images only, so only T1 W images were fed into the CNN in Stage I. The output of the first CNN and the 4-channel images which were comprised of each of the four different weighted MR images in each channel were concatenated as the input of the second BNN structure. The output of Stage II comprised the probabilistic map of the four different components and the uncertainty map. The details of network architecture, as well as the input and output, are provided in FIG. 2.

The CNN and BNN were trained separately. In one aspect, 80% of the data out of the whole dataset was selected as the training set. The CNN was trained with T1-weighted images only, and the network hyperparameters were optimized on the training set via five-fold cross-validation. Subsequently, the BNN was trained with the same training set but comprised of all multi-weighted MR images and vessel wall masks. The hyperparameter combination of BNN was optimized with the same method as that of CNN.

The loss functions of the CNN and BNN were a combination of cross-entropy loss, Dice loss, and K-L divergence loss, denoted by $\text{Loss}_{ce}$, $\text{Loss}_{Dice}$, and $\text{Loss}_{KLD}$ respectively. These loss functions are given by:

$$\text{Loss}_{ce} = (y_{true} \log (y_{pred}) + (1 - y_{true}) \log (1 - y_{pred}), \qquad (4)$$

$$\text{Loss}_{Dice} = 1 - \frac{2 \sum_{pixel} y_{true} y_{pred}}{\sum_{pixel} y_{true}^2 + \sum_{pixel} y_{pred}^2}, \qquad (5)$$

$$\text{Loss}_{KLD} = \sum_{pixel} y_{true} \log \left( \frac{y_{true}}{y_{pred}} \right). \qquad (6)$$

The mixed loss function of CNN, denoted by $\text{Loss}_{CNN}$, is given by:

$$\text{Loss}_{CNN} = \frac{1}{2} (\text{Loss}_{ce} + \text{Loss}_{Dice}). \qquad (7)$$

The purpose of the mixed loss function of CNN is to handle the class imbalance caused by the vessel wall, which often occupies a considerably smaller volume relative to the background.

The mixed loss function of BNN, denoted by $\text{Loss}_{BNN}$, is given by:

$$\text{Loss}_{BNN} = \frac{1}{2} (\text{Loss}_{ce} + \text{Loss}_{KLD}). \qquad (8)$$

The $\text{Loss}_{KLD}$ is added to the $\text{Loss}_{BNN}$ for the posterior distribution approximation of the BNN. With these computational resources, it took less than 4 seconds to segment a patient image.

Displaying the Segmentation Output

As the parameters of the BNN are a set of posterior distributions learned on the training dataset, an ensemble estimator with multiple predictors was applied to the output of Stage II. The final segmentation of plaque components was generated by assigning each pixel to the tissue categories with the highest probability. To clearly display the segmentation of carotid plaque, all final predictions of tissues were overlaid on T1-weighted images. The proposed method yields two types of uncertainty, namely aleatoric and epistemic uncertainty. The uncertainty was quantified on the 14-slice test data. The output of the proposed method consisted of the segmentation results of all tissue types and corresponding variance maps. First, the overall epistemic uncertainty map was obtained by calculating the mean of variance maps of all tissue categories. This uncertainty studies the influence of limited training data and provides a measure of the confidence of the segmentation results. The overall epistemic uncertainty map of the image was given by $$H(Y|X) = \frac{1}{M} \sum_{m=1}^{M} \text{Var}(y_m), \tag{9}$$

where Y is the prediction corresponding to input image X, and $y_m = y^1_m, y^2_m, \ldots, y^N_m$ is the ensemble estimate of N predictors corresponding to the $m_{th}$ tissue type. Next, to obtain the aleatoric uncertainty map, a test-time data augmentation method (TTDA) was applied. Specifically, TTDA involves creating multiple augmented copies of each image in the test set, having the model make a prediction for each, then returning an ensemble of those predictions. Similar to the epistemic uncertainty map, the overall estimation of aleatoric uncertainty of an image was inferred by $$H(Y|X) = \frac{1}{M} \sum_{m=1}^{M} \text{Var}(y_m), \tag{10}$$

where $y_m = y^1_m, y^2_m, \ldots, y^K_m$ is the ensemble estimation of K-time augmentation of the test image corresponding to the $m_{th}$ tissue type. In addition to the two overall uncertainty maps, the disclosed techniques also apply a class-wise uncertainty metric called predictive class-wise variance (PCV) to measure the epistemic uncertainty corresponding to tissue types of interest, which is defined as $$PCV(s) = \frac{1}{s} \sum_{y \in s} \sum_{k} \text{Var}(y = k), \tag{11}$$

where s represents all pixels that are segmented as class c, y is the predictive label and $$s = \left\{ y_i \middle| \arg\max_k p(y_i = k) = c, \forall y_i \in y \right\}.$$

Evaluation Studies

Plaque components segmentation: For plaque segmentation, disclosed techniques assess LRNC with older hemorrhage, calcification, and fibrous tissue. LRNC without hemorrhage and with fresh hemorrhage was not assessed due to the lack of samples of these tissue types. As disclosed herein, the performance of the proposed method is compared with U-Net, ResNet-101, and DeepLab v3. These methods were chosen as they are representative of the most frequently used deep-learning segmentation methods. All compared methods were trained with ground truth obtained with the assistance of the high-resolution images and optimized via five-fold cross-validation. The performance of the disclosed techniques is also compared to the performance of trained readers. In some aspects, two trained readers, each with two years of experience in MR imaging, referred to as Observer I and Observer II, segmented the 14-slice test data using customized software. The observers were not provided the ex vivo data or the histopathologic sections for these slices and each observer was asked to segment the regions of interest twice to decrease the intraobserver variability. The performance of each observer is then compared the performance of the disclosed techniques.

Impact of Using Histology and Ex Vivo Images to Define Ground Truth:

To investigate the impact of the high-resolution assisted ground-truth generation procedure on segmentation performance, a model was trained using a strategy where generating the ground truth did not involve referring to the high-resolution images. In this strategy, one observer was asked to manually annotate all 70 slices of the training set 3 times to eliminate intra-observer variability. The two-stage neural network was then trained with 3 sets of manually annotated ground truth separately. The performance using this strategy was then evaluated on the test set (14 slices) in reference to high-resolution ex vivo MR images and histopathology.

Evaluation with the External Dataset:

The proposed method was tested using the external test set consisting of 445 MR slices described above. An experienced reader with over four years of experience in MR imaging manually annotated 445 multi-weighted MR images using customized software. Next, the trained reader reviewed each preliminary label of the tissue types and manually corrected the wrong labels. Finally, the performance of the proposed method on the external test set was compared with the Standard U-Net, DeepLab v3, and ResNet-101.

Sensitivity to Variations in Training Data:

The sensitivity of the plaque segmentation to variations in training data was also assessed. The BNN training data was randomly separated into two subsets. The BNN was trained and optimized on these two subsets individually. This process yielded two versions of the proposed method, each trained with a different dataset. The 14-slice test data set is applied to each method, resulting in two sets of segmentation. The similarity of these two segmentation sets was determined using Dice similarity coefficient (DSC) figures of merit (FOM). High DSC values indicate less sensitivity to variations in the training data. Also in this experiment, the sensitivity of the standard U-Net method to data set variation was evaluated as a comparison.

In all the above experiments, to evaluate the performance, three FOMs were employed: DSC, precision, and sensitivity, given by $$\text{Dice} = \frac{2TP}{FN + FP + 2TP}, \tag{12}$$

$$\text{Sensitivity} = \frac{TP}{FN + TP}, \tag{13}$$

$$\text{Precision} = \frac{TP}{TP + FP}, \tag{14}$$

where TP, TN, FP, and FN denote true positive, true negative, false positive and false negative of prediction respectively. The mean values with 95% confidence intervals (Cis) of these FOMs were presented in the performance evaluation study. Statistical significance was estimated via a paired sample t-test, with a p-value<0.05 to draw the inference of statistically significant difference.

Plaque Components Segmentation Performance

The performance of the proposed method in segmenting each tissue type is shown in Table III(A)-(C). Table III(A)

displays DSC results. Table III(B) displays precision results. Table III(C) displays sensitivity results. In addition, FIG. 3 illustrates two representative results of plaque segmentation. The proposed method was observed to outperformed (p<0.05) all other methods on DSCs of all tissue types, yielding DSCs of 0.78 (95% confidence interval (CI): 0.75, 0.8), 0.62 (95% CI: 0.6, 0.65), and 0.74 (95% CI: 0.73, 0.76) with respect to LRNC with older hemorrhage, calcification, and fibrous tissue. The proposed method performed better than Observer I and Observer II on all tissue types and FOMs, as noted in Table III(A)-(C), with the exception of Observer II for calcification evaluated using the Sensitivity FOM. This demonstrates the higher accuracy of the disclosed techniques in comparison to human observers. Finally, as noted in Table III(A), the disclosed techniques obtained better DSCs of all tissue types, in comparison to those of the BNN trained with manually annotated ground truth.

Evaluation with External Dataset

The performance of the proposed method in the external validation test is shown in Table IV. The proposed method outperformed the Standard U-Net, DeepLab v3, and ResNet-101 methods. In addition, two representative results are shown in FIG. 4, which illustrates examples of external validation of the proposed method. The segmented LRNC with older hemorrhage 302 is shown in red, and the calcification 301 is in blue, using both the manual annotation and the proposed method. The manual annotations match the output obtained with the proposed techniques.

In these results, the proposed disclosed techniques provide segmentation results similar to manual segmentation for both LRNC with older hemorrhage and calcification. The manual labeling classified more tissue as LRNC with older hemorrhage in comparison to disclosed techniques, but the disclosed techniques are more generalizable to external datasets than the other state-of-the-art methods.

TABLE III(A)

Dice Performance in segmenting plaque components (95% confidence interval)

| | LR/NC with RH | Calcification | Fibrous tissue |
|---|---|---|---|
| Observer I | 0.71 (0.69, 0.72) | 0.52 (0.45, 0.58) | 0.58 (0.55, 0.6) |
| Observer II | 0.61 (0.59, 0.63) | 0.53 (0.52, 0.53) | 0.56 (0.5, 0.62) |
| Standard U-Net | 0.7 (0.68, 0.73) | 0.49 (0.46, 0.53) | 0.67 (0.6, 0.73) |
| Deepl,, ab V3 | 0.71 (0.69, 0.73) | 0.58 (0.55, 0.61) | 0.69 (0.67, 0.71) |
| ResNet-101 | 0.75 (0.73, 0.77) | 0.56 (0.53, 0.6) | 0.65 (0.61, 0.67) |
| The proposed 2-stage without high-resolution reference | 0.76 (0.73, 0.78) | 0.56 (0.55, 0.58) | 0.64 (0.61, 0.69) |
| The proposed method | 0.78 (0.75, 0.8) | 0.62 (0.6, 0.65) | 0.74 (0.73, 0.76) |

TABLE III(B)

Precision Performance in segmenting plaque components (95% confidence interval)

| | LR/NC with RH | Calcification | Fibrous tissue |
|---|---|---|---|
| Observer I | 0.8 (0.79, 0.8) | 0.44 (0.43, 045) | 0.56 (0.51, 0.6) |
| Observer II | 0.77 (0.75, 0.78) | 0.38 (0.39, 0.37) | 0.54 (0.46, 0.61) |
| Standard U-Net | 0.78 (0.76, 0.8) | 0.7 (0.67, 0.74) | 0.58 (0.51, 0.65) |
| Deepl,, ab V3 | 0.8 (0.78, 0.82) | 0.63 (0.6, 0.66) | 0.71 (0.69, 0.73) |
| ResNet-101 | 0.83 (0.81, 0.85) | 0.64 (0.61, 0.68) | 0.63 (0.59, 0.65) |
| Proposed 2-stage NN without high-resolution reference | 0.68 (0.65, 0.7) | 0.76 (0.75, 0.78) | 0.75 (0.7, 0.82) |
| The proposed method | 0.76 (0.71, 0.8) | 0.55 (0.53, 0.58) | 0.72 (0.71, 0.74) |

TABLE III(C)

Sensitivity Performance in segmenting plaque components (95% confidence interval)

| | LR/NC with RH | Calcification | Fibrous tissue |
|---|---|---|---|
| Observer I | .64 (0.61, .66 | .68 (0.5, 0.8) | .58 (0.56, 0.6) |
| Observer II | 0.51 (0.55, 0.64) | 0.83 (0.8, 0.85) | 0.58 (0.53, 0.62) |
| Standard U-Net | 0.64 (0.62, 0.66 | .38 (0.35, 0.41 | .79 (0.75, 0.83) |
| DeepLab V3 | 0.64 (0.62, 0.66) | 0.54 (0.51, 0.57) | 0.67 (0.65, 0.69) |
| ResNet-101 | 0.68 (0.66, 0.7) | 0.5 (0.47, 0.54) | 0.67 (0.63, 0.69) |
| Proposed 2-stage NN without high-resolution reference | 0.86 (0.83, 0.88) | 0.44 (0.43, 0.46) | 0.56 (0.53, 0.61) |
| The proposed method | 0.8 (0.79, 0.81) | 0.71 (0.69, 0.74) | 0.76 (0.7, 0.82) |

TABLE IV

| External validation of proposed method and comparison with other DL approaches | | | |
|---|---|---|---|
| | LR/NC with OH | Calcification | Fibrous tissue |
| (a) Dice | | | |
| Standard U-Net | 0.61 | 0.54 | 0.69 |
| DeepLab v3 | 0.65 | 0.54 | 0.67 |
| ResNet-I | 0.6 | 0.53 | 0.66 |
| The proposed method | 0.7 | 0.6 | 0.73 |
| (b) Precision | | | |
| Standard U-Net | 0.79 | 0.45 | 0.72 |
| DeepLab v3 | 0.88 | 0.42 | 0.61 |
| ResNet-101 | 0.76 | 0.6 | 0.6 |
| The proposed method | 0.78 | 0.65 | 0.65 |
| (c) Sensitivity | | | |
| Standard U-Net | 0.5 | 0.69 | 0.67 |
| DeepLab v3 | 0.52 | 0.75 | 0.75 |
| ResNet-101 | 0.49 | 0.47 | 0.74 |
| The proposed method | 0.63 | 0.56 | 0.83 |

Sensitivity to Variations in Training Data

Table V shows the DSC between the segmentations yielded by the proposed method when the method was trained with two different training datasets. It can be observed that the DSC with the proposed method was greater than 0.8 for all three plaque components. This provides evidence that the model is just as or more robust than U-Net and is relatively insensitive to variations in the training data.

TABLE V

| Sensitivity to variations in training data | | | |
|---|---|---|---|
| | LR/NC with OH | Calcification | Fibrous tissue |
| (a) Dice | | | |
| Standard U-Net | 0.83 | 0.73 | 0.76 |
| The proposed method | 0.84 | 0.81 | 0.85 |
| (b) Precision | | | |
| Standard U-Net | 0.87 | 0.77 | 0.67 |
| The proposed method | 0.87 | 0.85 | 0.82 |
| (c) Sensitivity | | | |
| Standard U-Net | 0.8 | 0.7 | 0.87 |
| The proposed method | 0.82 | 0.78 | 0.88 |

Uncertainty Measurement

The epistemic uncertainty corresponding to different tissues is illustrated with predictive class-wise variance (PCV) coefficients in Table VI. Calcification had the lowest uncertainty, as observed in FIG. 3. In particular, FIG. 3 depicts examples of external validation of the proposed method. A color version of this image illustrates the segmented LRNC with older hemorrhage 302 is shown in red, and the calcification 301 in blue, using both the manual annotation and the disclosed techniques. The manual annotations match the output obtained with the disclosed techniques.

TABLE VI

| Epistemic uncertainty of different tissues | | | |
|---|---|---|---|
| | LR/NC with OH | Calcification | Fibrous tissue |
| PCV | 0.0558 | 0.178 | 0.712 |

The marked difference in pixel intensities between calcification and surrounding tissues reduces the uncertainty in segmented calcified regions. For LRNC with older hemorrhage and fibrous tissue, PCV coefficients were higher because of the relatively large size in vessel wall volume and less distinction from the background. This can also be seen in FIG. 3 where the highlighted regions in the uncertainty map mainly concentrate on the edges of LRNC with older hemorrhage and fibrous tissue.

Atherosclerosis is a chronic and progressive disease that is characterized by the accumulation of lipids and fibrous tissue within the artery wall. Disruption of atherosclerotic plaque is the underlying cause of ischemic stroke, with the histological composition of carotid atheroma, specifically LRNC, related to a plaque's vulnerability to rupture. To identify this plaque component, the disclosed techniques include a two-stage neural network model with CNN and BNN architecture to segment carotid atherosclerotic plaque components based on multi-weighted MR images and measure the uncertainty of the segmentation output.

Several supervised algorithms to segment in vivo carotid plaque components in multi-weighted MRI have been developed to facilitate the accurate assessment of plaque composition. However, these methods are highly dependent on manually annotated ground truth, which may adversely impact segmentation performance. To address this issue, the proposed strategy where ground truth labels for training are generated with the assistance of high-resolution ex vivo MR images and histopathology images in deep learning-based carotid atherosclerotic plaque segmentation. As the results in Table III(A)-(C) show, this strategy yields superior performance ($p<0.05$) in the segmentation of LRNC with older hemorrhage, calcification, and fibrous tissue compared to an approach that uses only the manually labeled ground truth for training.

This result shows that access to high-resolution ex vivo data and histopathology data during ground truth generation can help improve segmentation performance. Further, the method provided superior performance ($p<0.05$) compared to trained readers who were not provided the high-resolution images. This again demonstrates the advantage of training the method using ground truth generated with high-resolution data.

The proposed method outperformed ($p<0.05$) all compared deep-learning methods. This improved performance of the disclosed techniques may be attributed to the probabilistic parameters in BNN, application of ensemble predictors, and resistance of the BNN to overfitting. The published segmentation criterion of atherosclerotic plaque components is subjective rather than objective, which often results in more than one plausible solution for a given input and introduces uncertainty into the segmentation task. The three other comparison methods have been shown to perform well on segmentation tasks where there is certainty in the ground truth. The uncertainty in the ground truth, namely, the selection of reference muscle tissues, and the smaller size of the dataset may have adversely impacted the performance of the other three considered methods. Moreover, the method also provided quantitative estimations of uncertainty. The uncertainty maps and PCV values with respect to epistemic uncertainty show how reliable the segmentations are, indicate potential m is-segmented regions, and provide guidance for user interactions.

Table III(A)-(C) illustrate that, among all three tissue types, the disclosed techniques yielded the best performance in segmenting LRNC with hemorrhage. This may be attributed to a relatively high sample size of LRNC with older hemorrhage in the data set, providing an abundance of training samples. Moreover, the relatively high contrast of LRNC with older hemorrhage on all 4 contrast-weighted images also contributes to this performance. The fibrous tissue is as common as LRNC with older hemorrhage. Calcification is hypointense on all four contrast-weighted images, which would make calcification easy to be segmented by the disclosed model.

Next, the proposed method yielded good performance (DSC=0.7) in segmenting LRNC with hemorrhage with an external validation test set of 23 patients. This is of much importance in clinical practice. Finally, in Table V, it was observed that the disclosed techniques were relatively insensitive to changes in training data samples. This improved performance is again likely because of the approach to generating ground truth labels. More specifically, it is likely that access to high-resolution data reduces variability in ground-truth label generation, and thus makes the method less sensitive to changes in training data. This result also has important practical implications since it implies that the method could be trained at different centers, and still may yield similar performance. Overall, these results provide evidence of the generalizability of the proposed method to the external dataset and to variations in training data.

The disclosed techniques include a two-stage neural network-based approach for carotid atherosclerotic plaque segmentation in multi-weighted MRI and was trained with the assistance of high-resolution imaging and histology images, outperformed (p<0.05) state-of-the-art segmentation methods, yielded Dice scores of 0.78 (95% CI: 0.75, 0.8) in segmenting LRNC with hemorrhage using an independent test set, and outperformed (p<0.05) a strategy where the method was trained without the assistance of these high-resolution images.

The deep-learning method trained on ground truth obtained with the assistance of high-resolution ex vivo and pathology data provides accurate performance on segmentation of carotid plaque components on MR images, outperforms current segmentation methods, and provides superior performance compared to trained readers. Additionally, the disclosed techniques are insensitive to variations in training data and yielded reliable segmentation over external datasets.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A method, comprising:
receiving at least one image of a patient;
providing the at least one image of the patient to a multi-stage trained model for segmenting the at least one image; and processing the at least one image based on the multi-stage trained model to segment the at least one image into a plurality of segmented images that are separated based on plaque components by:
generating identification information of a tissue region of the patient from the at least one image in a first stage of the multi-stage trained model, wherein the identification information of the tissue region comprises a mask that identifies a lumen and outer artery wall of a carotid plaque tissue, wherein the first stage is a convolutional neural network;
combining the mask with the at least one image into a combined image;
providing the combined image to a second stage of the multi-stage trained model;
mapping each pixel in the combined image into a type of plaque component; and
outputting the plurality of segmented images corresponding to the type of plaque component.

2. The method of claim 1, wherein the mapping each pixel in the combined image comprises:
for each pixel, determining a probability that the pixel corresponds to each type of plaque component.

3. The method of claim 2, wherein the types of plaque components are selected from the group consisting of lipid rich necrotic core (LRNC) with hemorrhage, calcification, and fibrous tissue.

4. The method of claim 3, wherein the second stage of the multi-stage trained model is a Bayesian deep neural network.

5. The method of claim 1, wherein a high-resolution image data set informs the training of a segmentation and classification network to improve segmentation of the multi-stage trained model and classification capabilities of the multi-stage trained model to be above a training data set of the same resolution as a test imaging data set.

6. A non-transitory computer readable medium storing instructions thereon that when executed by at least one processor, cause the at least one processor to perform operations for processing at least one image, the operations comprising:
receiving at the least one image of a patient;
providing the at least one image of the patient to a multi-stage trained model for segmenting the at least one image; and
processing the at least one image based on the multi-stage trained model to segment the at least one image into a plurality of segmented images that are separated based on plaque components by:
generating identification information of a tissue region of the patient from the at least one image in a first stage of the multi-stage trained model, wherein the identification information comprises a mask that identifies a lumen and outer artery wall of a carotid plaque tissue, wherein the first stage is a convolutional neural network;
combining the mask with the at least one image into a combined image;
providing the combined image to a second stage of the multi-stage trained model;
mapping each pixel in the combined image into a type of plaque component; and
outputting the plurality of segmented images corresponding to the type of plaque component.

7. The non-transitory computer readable medium of claim 6, wherein the mapping of each pixel in the combined image comprises:

for each pixel, determining a probability that the pixel corresponds to each type of plaque component.

8. The non-transitory computer readable medium of claim 7, wherein the types of plaque components are selected from the group consisting of lipid rich necrotic core (LRNC) with hemorrhage, calcification, and fibrous tissue.

9. The non-transitory computer readable medium of claim 8, wherein the second stage of the multi-stage trained model is a Bayesian deep neural network.

10. The non-transitory computer readable medium of claim 6, wherein a high-resolution image data set informs the training of a segmentation and classification network to improve segmentation of the multi-stage trained model and classification capabilities of the multi-stage trained model to be above a training data set of the same resolution as a test imaging data set.

* * * * *